April 17, 1928.

R. C. SPEER 1,666,671

APPARATUS FOR WASHING GLASSES AND THE LIKE

Filed May 17, 1927 4 Sheets-Sheet 1

INVENTOR

April 17, 1928.  R. C. SPEER  1,666,671
APPARATUS FOR WASHING GLASSES AND THE LIKE
Filed May 17, 1927  4 Sheets-Sheet 3

INVENTOR
Reid C. Speer
by James Bradley

April 17, 1928.  
R. C. SPEER  
1,666,671  
APPARATUS FOR WASHING GLASSES AND THE LIKE  
Filed May 17, 1927 4 Sheets-Sheet 4

INVENTOR  
Reid C. Speer  
by  
James C. Bradley

Patented Apr. 17, 1928.

1,666,671

UNITED STATES PATENT OFFICE.

REID C. SPEER, OF PITTSBURGH, PENNSYLVANIA.

APPARATUS FOR WASHING GLASSES AND THE LIKE.

Application filed May 17, 1927. Serial No. 191,971.

Figure 1:
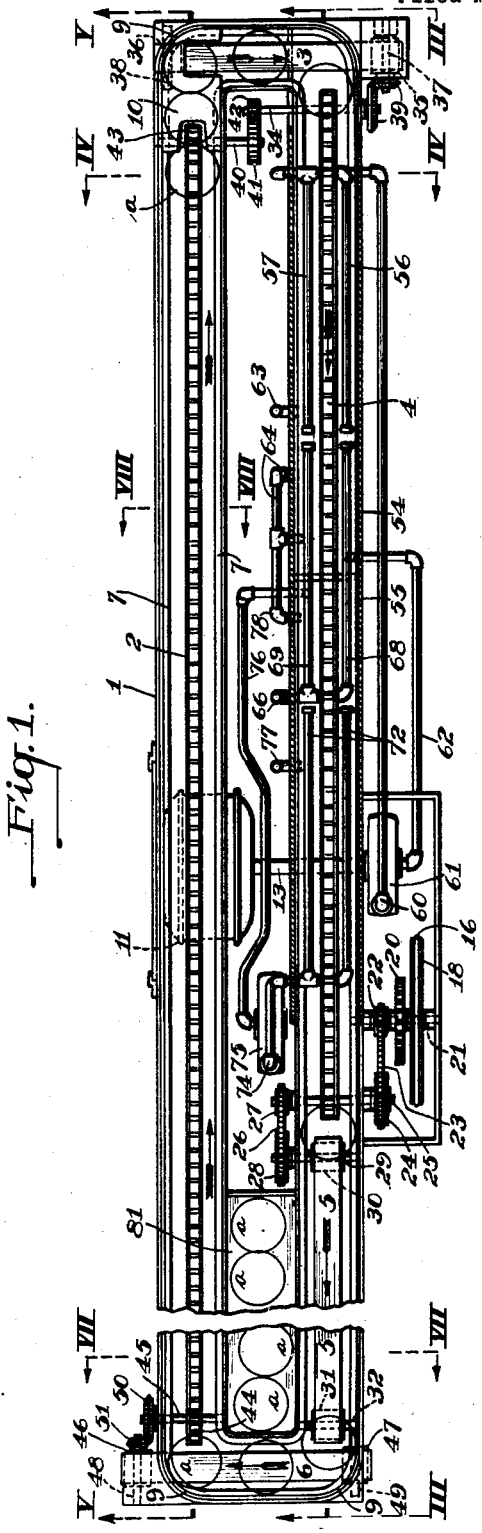
Figure 2:
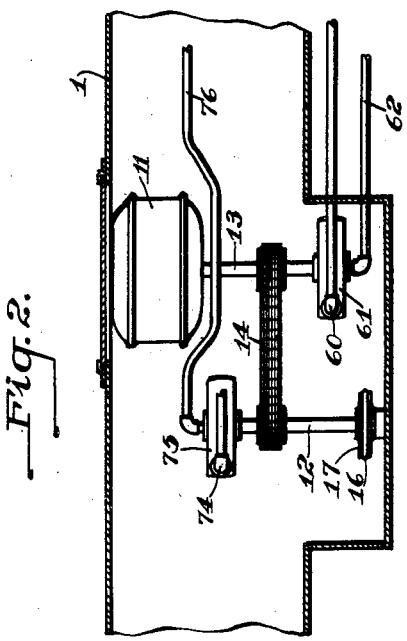
Figure 3:
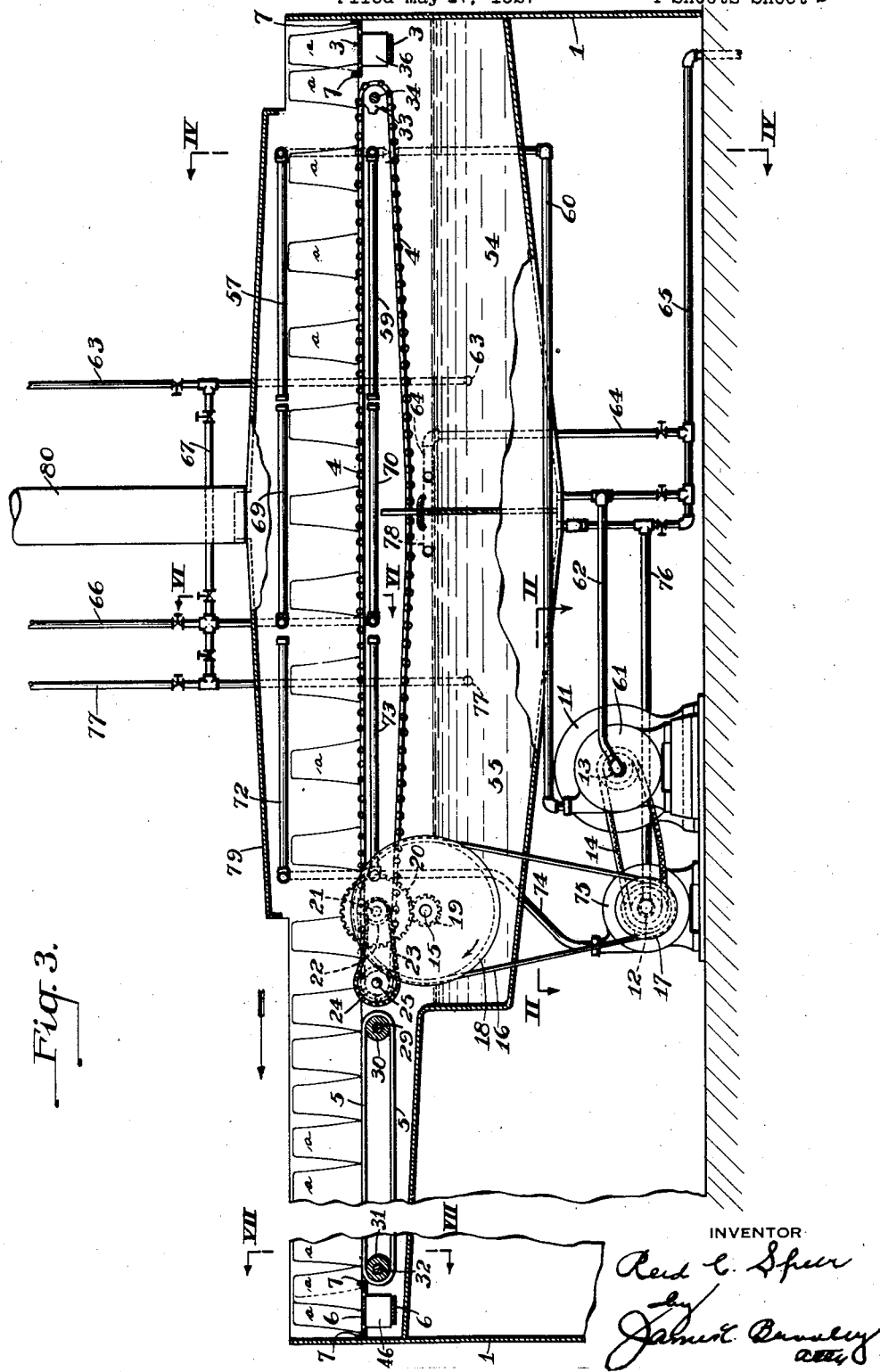
Figure 4:
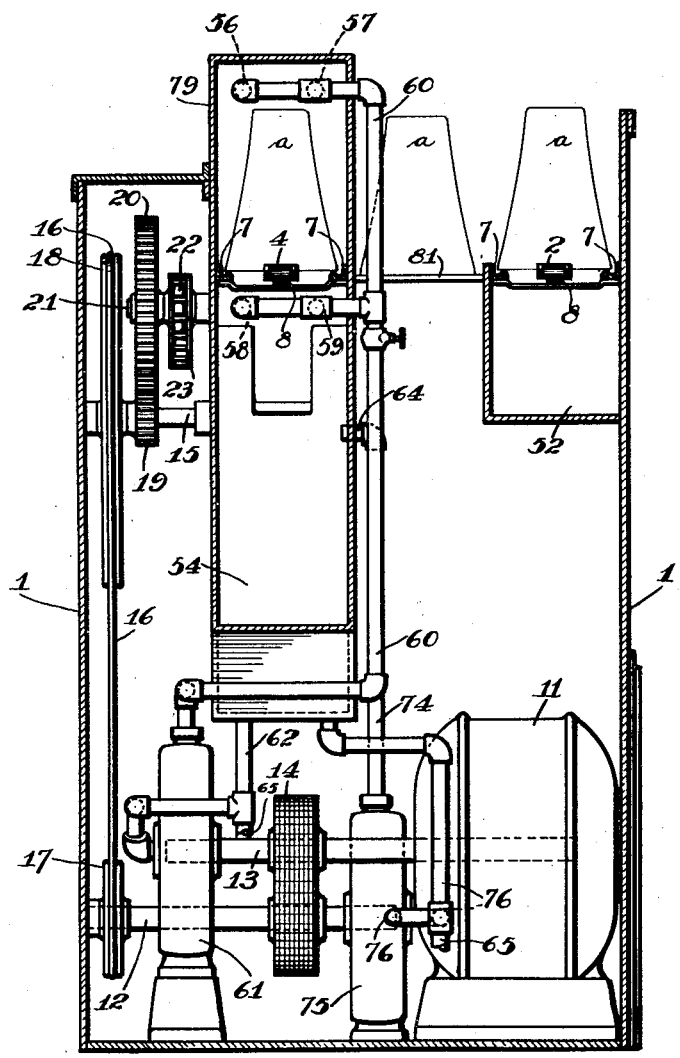
Figure 5:
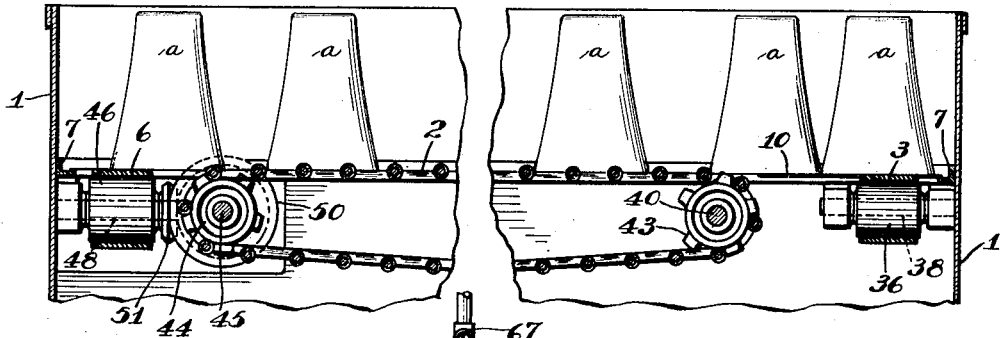
Figure 6:
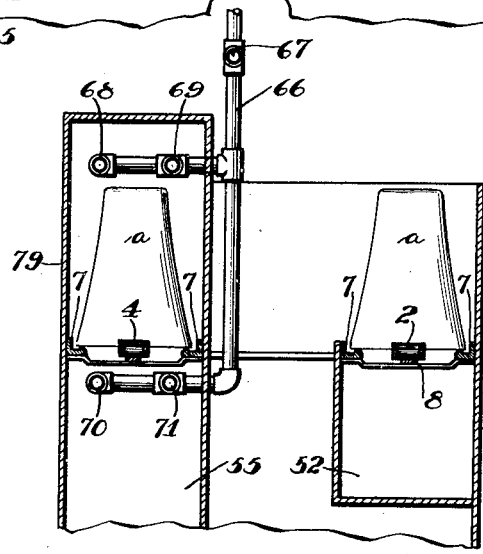
Figure 7:
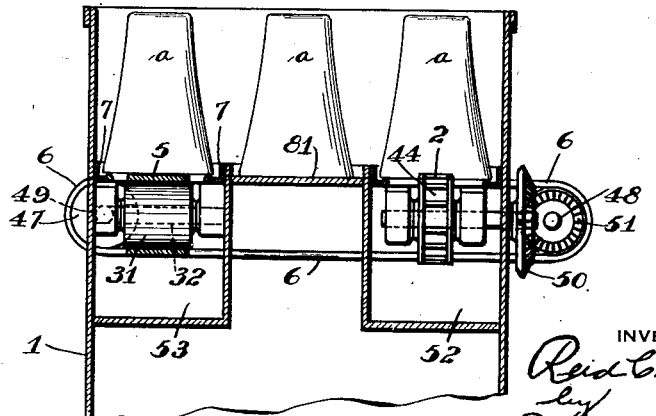

The invention relates to an apparatus for washing containers, such as glasses or dishes. It may be used to particular advantage in any location where a large number of glasses are required, as in a retail store, where beverages are dispensed, such as milk, soda and the like. The apparatus is so constructed that the belt or conveyer, upon which the glasses are placed for washing, and from which they are removed after washing, may be located just beneath the counter, out of sight and in convenient reach of the attendant. The spraying apparatus and mechanism for operating the conveyer, may be located at the end of the dispensing counter or even outside the dispensing room, if desired. The invention has for its principal objects; (1) the provision of a relatively cheap, simple apparatus, which can be installed, as above indicated, and which will wash the glasses so thoroughly as to meet every sanitary requirement; (2) the provision of a machine having an improved form of runway, and conveyer means cooperating therewith, which will carry the glasses through the washing circuit with certainty and without breakage; (3) the provision of improved means arranged in co-operating relation with the conveyer means, for circulating and applying the fluid for cleansing the glasses and then rinsing them; and (4) the provision of an apparatus which will operate indefinitely with little attention, and in which the cost of operating and upkeep is reduced to a minimum. Certain embodiments of the invention are illustrated in the accompanying drawings, wherein:

Figure 1 is a plan view, partly in section. Fig. 2 is a partial section on the line II—II of Fig. 3. Fig. 3 is a section on the line III—III of Fig. 1. Fig. 4 is a section on the line IV—IV of Figs. 1 and 3. Fig. 5 is a partial section on the line V—V of Fig. 1. Fig. 6 is a section on the line VI—VI of Fig. 3. Fig. 7 is a section on the line VII—VII of Fig. 3, and Fig. 8 is an enlarged detail section on the line VIII—VIII of Fig. 1.

Briefly stated, the apparatus comprises a circuit of endless belts or chains having their upper flights horizontal, and adapted to carry the glasses past spraying apparatus and return them to starting position. One of the conveyers runs just beneath the dispensing counter, parallel thereto, so that it is within easy reach of the attendant, who can remove the clean glasses from the procession upon the conveyer, as they are needed and substitute used ones. The glasses rest partly upon the belts or chains and partly upon guides or rails on each side of the chain or belt, so as to prevent the glasses from tipping or sliding sidewise off of the belt or chain.

Referring to the drawings, 1 is the framework, preferably of metal which carries the five endless conveyers, 2, 3, 4, 5, and 6, driven in the direction, as indicated by the arrows, so that the upper flights of the conveyers constitute a circuit. The short end conveyers 3 and 6, and the conveyer 5, are in the form of leather or canvas belts, while the conveyers 1 and 3 are in the form of chains. At each side of each conveyer is a rail 7, which is L-shape in cross section, Figs. 4, 6, 7 and 8. The horizontal flanges of these rails are adapted to engage the edges of the glasses, a, a, a, etc. and prevent them from tipping, while the vertical flanges prevent the glasses from sliding sidewise off of the conveyers.

Figure 8:
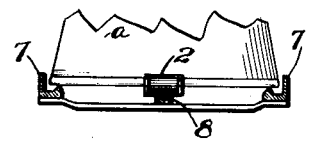

As indicated in Figs. 5, 6 and 8, the links of the chains constituting the conveyers 2 and 4 are at a level with respect to the guide rails 7, such that they catch the edges of the glasses, dragging them along and taking part of their weight. Similarly, the canvas or leather belts 3, 5 and 6 have their upper flights at a level such that they take most of the weight of the glasses, so that they readily drag them along the guide rails, such rails serving, as above indicated, to prevent tipping and to keep the glasses centered in the belts. In order to keep the upper flights of the conveyers 2, 4 and 5 from sagging, supporting strips 8 are provided therebeneath, supported from the rails (Figs. 6 and 8).

As indicated in Fig. 1, the outer guide rails 7 are connected at their ends by the curved sections 9, which sections serve to guide the glasses around the corners from one conveyer to the next one. The ends of the conveyers 2 and 3 are separated from each other, so that there are no conveyer means at these points. This is taken care of by the feeding action of the glasses behind the one which occupies the blank space between the conveyers. When the glass reaches this point, it stops until the oncoming glass behind it engages it and crowds or pushes it ahead, so that it engages and follows the curved section 9 of the guide rail, and its lower edge is caught by the belt 2. It is then moved along by the belt 2, and when it reaches the next curved flange 9, it is cammed laterally till it is engaged by the chain 4. The other corners are turned similarly. A plate 10 (Figs. 1 and 5) lies in the space between the ends of the conveyers 2 and 3, and the conveyer 3 is so positioned that its upper surface (Fig. 5) lies substantially flush with the top of the plate. This arrangement permits the glasses to slide off of the plate and onto the conveyer without catching. Similar expedients are employed at the other corners to prevent the glasses from catching as they pass from one conveyer to the next one.

The conveyers are all driven from the motor 11, which also drives the pumps for operating the spraying apparatus, as later described. The countershaft 12 is driven from the motor shaft 13 by the chain belt 14 (Fig. 2) and a second countershaft 15 (Figs. 3 and 4) is driven from the shaft 12 through the intermediary of the belt 16 and pulleys 17 and 18. The shaft 15 carries a pinion 19 (Fig. 3) meshing with a spur gear 20 on the shaft 21, which shaft 21 carries a sprocket 22, around which passes the sprocket chain 23. The chain 23 drives a sprocket 24 carried by the shaft 25 around which passes one of the conveyer chains 4.

The conveyer belt 5 is driven from the shaft 25 by a chain 26 passing around sprockets 27 and 28, keyed to the ends of the shafts 25 and 29, the latter of which carries the pulley 30, which drives the belt 5, passing at its other end around the pulley 31 carried by the shaft 32.

The chain 4 passes, at its left hand end, (Figs. 1 and 3) around a sprocket 33 on the shaft 34. The conveyer belt 3 passes around pulleys 35 and 36 on the shaft 37 and 38, and the shaft 37 is driven from the shaft 34 by the bevel gears 39.

The shaft 34 also drives the shaft 40 through the intermediary of the spur gears 41 and 42, and the shaft 40 carries a sprocket 43 (Fig. 3), around which passes the conveyer chain 2. The other end of this chain passes around a sprocket 44 on the shaft 45.

The conveyer belt 6 passes around pulleys 46 and 47 on the shafts 48 and 49 and is driven from the shaft 45 by the bevel gears 50 and 51, keyed to the shafts 45 and 48. It will be noted that the belt 6 extends past the curved corner guide 9, heretofore referred to, so that the glasses are carried into contact with this curved guide, which cams them to the right (Fig. 1), so that they are engaged by the chain 2. The arrangement of the other end belt 3 is the same, the glasses being caused to move from the belt 3 to the conveyer chain 4 by the camming action of the curved corner guide 9. The conveyers 2 and 5 preferably have beneath them the drain compartments 52 and 53 (Figs. 4, 6 and 7), while the conveyer 4 has beneath it the hot and cold water tanks 54 and 55 (Figs. 3 and 4), over which the washing of the glasses by means of sprays 70 is carried out, as hereinafter described.

In order to wash the glasses with hot water, the four spray pipes 56, 57, 58 and 59 (Figs. 1 and 4) are employed, the first two being above the glasses, and the other two below, as indicated in Fig. 4. These pipes are perforated, so as to distribute the water inside and outside the glasses, and are supplied with water under pressure through the pipe 60 by the rotary pump 61, such pump being driven directly from the shaft 13 of the motor. The intake of the pump is supplied by means of the pipe 62 leading from the bottom of the hot water drain tank 54. Additional water to take the place of that lost is supplied from the pipe 63, and a constant level is maintained in the tank by the overflow pipe 64, leading to the drain pipe 65. Steam may be supplied to the tank from the pipe 66 to heat the water in the tank via the pipes 67 and the lower end of the pipe 63. Steam may also be supplied to the spray pipes 68, 69, 70 and 71 (Figs. 1 and 6) from the pipe 66, which is connected to the left hand end of such pipes (Fig. 3). The hot water tank is supplied with soap or equivalent material from time to time, as needed.

After the glasses are washed with the hot soapy water from the pipes 56, 57, 58 and 59 and sterilized by steam from the pipes 68, 69, 70 and 71, they pass between four cold water spray pipes 72, 72 and 73, 73, the arrangement of such pipes being similar to that of the hot water spray pipes. These pipes are supplied with cold water under pressure by means of the pipe 74, and rotary pump 75, such pump having its shaft 12 driven from the shaft 13 of the motor 11 by means of the belt 14, as heretofore explained. The intake to the pump is supplied from the drain tank 55 by means of the pipe 76. Additional water is supplied to the tank by the pipe 77; and an overflow 78 leading to the pipe 65 serves to maintain a constant level in the tank. In order to take care of the steam, and prevent the escape of water into the room in which the apparatus is located, the casing 79 (Fig. 3) is provided around the spraying devices, with an exhaust pipe 80 leading upward therefrom. Suitable exhaust apparatus may be applied to this pipe, if desired, to carry away the vapor and any objectionable odors.

In operation, the glasses to be washed are placed on the conveyer chain 2 at any desired point or points along its length, and make the circuit, as provided by this conveyer, and the conveyers 3, 4, 5 and 6. During this circuit, they pass the spraying devices and are cleaned, sterilized and cooled, being delivered in cleaned condition upon the conveyer 2. Here they are removed by the operator and reused or placed upon the storage table or plate 81; or, if the attendant is busy, they may be left upon the conveyer and allowed to circulate around the circuit until it is convenient to remove them. The drives of the conveyers 3, 4, 5 and 6 are all somewhat faster than that of the conveyer 2, so that the glasses are separated during the circuit, which increases the smoothness of operation, and decreases the danger of chipping and breaking. As indicated in Fig. 8, the horizontal flanges of the guide rails 6 are preferably provided with V-shaped ridges which reduce the area of contact with the glasses. This minimizes any soiling of the edges of the washed glasses which pass onto the guide flanges along the sides of the conveyer 1 before the attendant has an opportunity to remove them. These guide flanges are liable to become soiled by the liquids dripping from the used glasses which are placed upon the conveyer 1. This difficulty may be avoided entirely by removing the washed glasses before they reach the portion of the conveyer on which the used glasses are placed, but in rush periods, it may not always be possible to do this, and the ridging of the guide rails reduces the trouble to a minimum.

What I claim is:

1. In combination in an apparatus for washing containers, a plurality of driven, endless conveyors having horizontal flights adapted to directly receive and support the containers upon the upper faces of said conveyors arranged in substantially the same plane and end to end, so that such flights together form a circuit, guide means fixed with respect to said conveyors along the sides thereof for holding the containers in upright position and washing means arranged in proximity to one of said flights, so as to wash the containers carried thereby.

2. In combination in an apparatus for washing containers, a plurality of driven, endless conveyors having horizontal flights adapted to directly receive and support the containers upon the upper faces of said conveyors arranged in substantially the same plane and end to end, so that such flights together form a circuit, guide means fixed with respect to said conveyors along the sides thereof for holding the containers in upright position, guide means at the meeting ends of said flights for causing the containers to pass from one flight to the next when they reach said ends, and washing means arranged in proximity to one of said flights so as to wash the containers carried thereby.

3. In combination in an apparatus for washing containers, a plurality of driven, endless conveyors having horizontal flights arranged in substantially the same plane and end to end, so that such flights together form a circuit, a guide rail on each side of said flights positioned so as to engage the lower side edges of the containers and to prevent them from falling over or from moving laterally off of said flights, and washing means arranged in proximity to one of said flights so as to wash the containers carried thereby.

4. In combination in an apparatus for washing containers, a plurality of driven, endless conveyors, having horizontal flights arranged in substantially the same plane and end to end, so that such flights together form a circuit, a guide rail on each side of said flights positioned so as to engage the lower side edges of the containers and to prevent them from falling over or from moving laterally off of said flights, the outer ones of said guide rails having curved connecting portions where their ends meet for guiding the containers from one of said flights to the next one, and washing means arranged in proximity to one of said flights, so as to wash the containers carried thereby.

5. In combination in an apparatus for washing containers, a plurality of driven, endless conveyors, having horizontal flights arranged in substantially the same plane and end to end, so that such flights together form a circuit and washing means arranged in proximity to one of said flights so as to wash the containers carried thereby, the successive conveyors being driven at increasing speed so as to cause a widening in the spaces between the containers during their progress around the circuit.

6. In combination in an apparatus for washing containers, a plurality of driven, endless conveyors having horizontal flights arranged in substantially the same plane and end to end, so that such flights together form a circuit, and washing means arranged in proximity to one of said flights so as to wash the containers carried thereby, the first one of said conveyors upon which the containers are placed being in the form of a sprocket chain, whose links fit up inside the containers, and the next conveyor to which the chain delivers, being of fabric to permit the ready transfer of the containers to such conveyor.

7. In combination in an apparatus for washing containers, a plurality of driven endless conveyors having horizontal flights arranged in substantially the same plane and end to end, so that such flights together form a circuit, a guide rail on each side of said flights of L-shape in cross section, positioned so as to engage the bottom edges of the containers, and washing means for the containers located along the line of travel of one of said conveyors.

8. In combination in an apparatus for washing containers, a plurality of driven, endless conveyors having horizontal flights arranged in substantially the same plane and end to end, so that such flights together form a circuit, a guide rail on each side of said flights, of L-shape in cross section positioned so as to engage the bottom edges of the containers, and washing means for the containers located along the line of travel of one of said conveyors, said guide rails along the first conveyor flight having their horizontal flanges provided with longitudinal engaging ribs at their inner ends.

9. In combination in an apparatus for washing containers, a plurality of driven, endless conveyors having horizontal flights arranged in substantially the same plane and end to end, so that such flights together form a circuit, a guide rail on each side of said flights, of L-shape in cross section positioned so as to engage the bottom edges of the containers, and washing means for the containers located along the line of travel of one of said conveyors, said guide rails along the first conveyor flight having their horizontal flanges provided with longitudinal engaging ribs, at their inner ends of wedge cross section.

In testimony whereof, I have hereunto subscribed my name this 13th day of May, 1927.

R. C. SPEER.